June 11, 1968     W. JOHN     3,387,347
APPARATUS FOP SHAPING POTTERY IN REVOLVING
CERAMIC-MASS CONTAINING MOLDS Filed Feb. 23, 1965     3 Sheets-Sheet 1

INVENTOR
WILLY JOHN
BY
Michael J. Striker
his ATTORNEY

June 11, 1968
W. JOHN
3,387,347
APPARATUS FOR SHAPING POTTERY IN REVOLVING
CERAMIC-MASS CONTAINING MOLDS
Filed Feb. 23, 1965
3 Sheets-Sheet 2
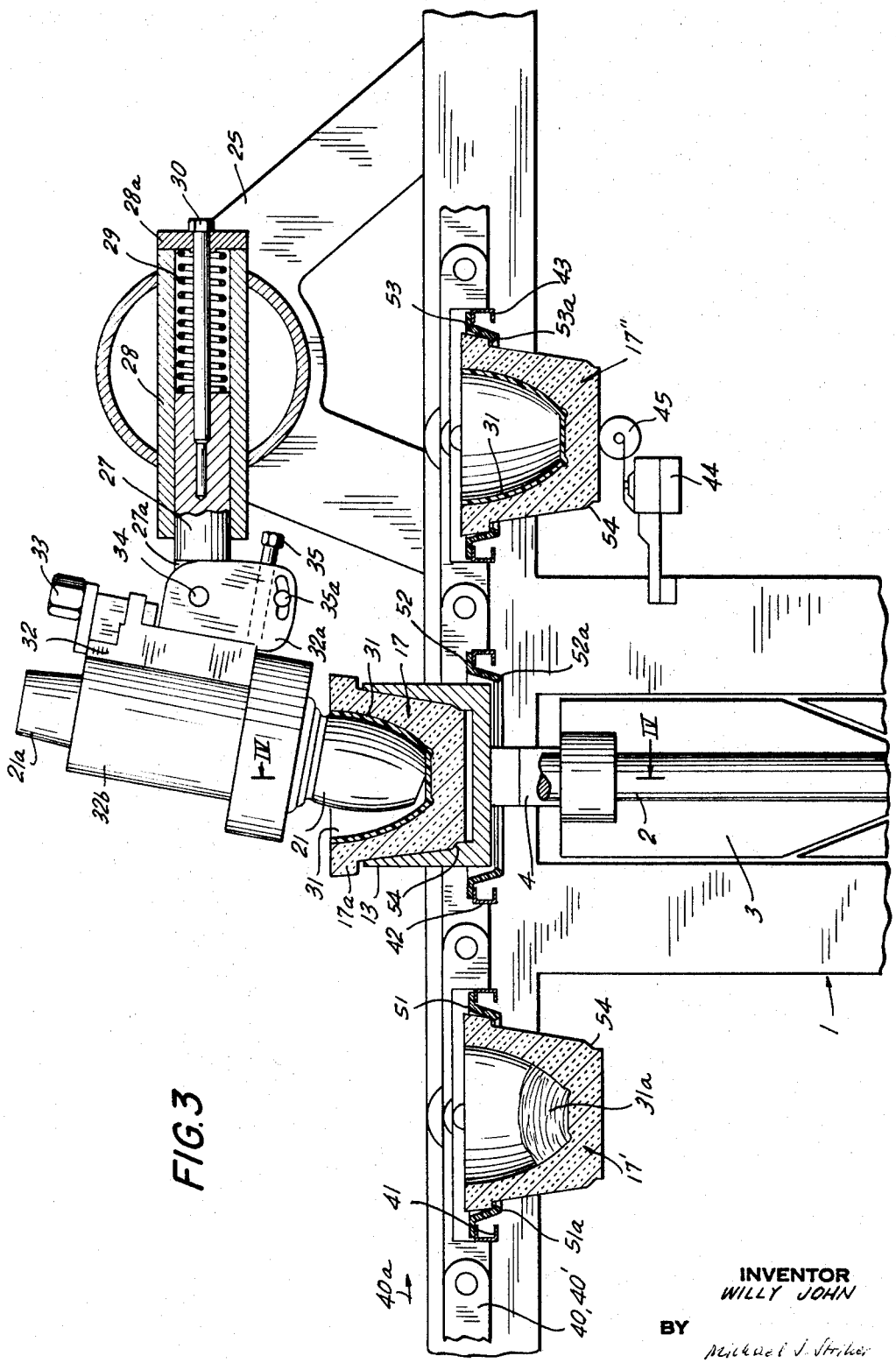
INVENTOR
WILLY JOHN
BY
Michael J. Striker
his ATTORNEY June 11, 1968   W. JOHN   3,387,347
APPARATUS FOR SHAPING POTTERY IN REVOLVING
CERAMIC-MASS CONTAINING MOLDS
Filed Feb. 23, 1965   3 Sheets-Sheet 3

INVENTOR
WILLY JOHN
BY
Michael J. Striker
his ATTORNEY

# United States Patent Office 3,387,347
Patented June 11, 1968

3,387,347
APPARATUS FOR SHAPING POTTERY IN REVOLVING CERAMIC-MASS CONTAINING MOLDS
Willy John, Selb, Germany, assignor to
Gebrueder Netzsch, Selb, Germany
Filed Feb. 23, 1965, Ser. No. 434,453
Claims priority, application Germany, Feb. 21, 1964,
N 24,487
12 Claims. (Cl. 25—26)

ABSTRACT OF THE DISCLOSURE

An apparatus for shaping articles of pottery, in which a plurality of rows of molds are intermittently transported to a position of alignment with a corresponding row of jigger heads mounted on upper ends of rotating spindles, which in turn are carried by a carriage reciprocable in a vertical plane so that the molds in an aligned row may be simultaneously lifted during upward movement of the carriage into a position in which a plurality of shaping tools mounted on a common slide will jigger ceramic masses in the molds, and wherein the slides and the plurality of tools carried thereby are movable in a horizontal plane while the molds are in the lifted position to simultaneously move the shaping tools relative to the lifted molds.

---

The present invention relates to a method and apparatus for the manufacture of cups, bowls, plates and similar articles of pottery. More particularly, the invention relates to an apparatus which is especially suited for mass-production of cups and the like. Still more particularly, the invention relates to an improved jiggering apparatus wherein two or more cups or similar articles of pottery may be shaped in a simultaneous operation.

It is an important object of the present invention to provide a very simple, compact, reliable and fully automatic apparatus which is constructed and assembled in such a way that a large number of articles of pottery may be jiggered in a simultaneous operation.

Another object of the invention is to provide an apparatus of the just outlined characteristics wherein masses of ceramic material may be treated in two or more stages to effect gradual transformation of each mass into a cup or a similar article of pottery whose walls are free of voids, whose material is compacted with utmost precision and with a high degree of uniformity, and whose walls are of identical thickness.

A further object of the invention is to provide a jiggering apparatus which may be rapidly and conveniently converted for treatment of differently dimensioned and/or configurated articles of pottery.

An additional object of the invention is to provide a novel mounting for the jigger heads and for the shaping tools in an apparatus of the above outlined characteristics.

A concomitant object of the invention is to provide a novel actuating and adjusting mechanism for the jigger heads and shaping tools of a jiggering apparatus and to provide an automatic control system which tests the integrity of molds and is capable of warning the operators or of arresting the apparatus if a mold happens to be damaged or destroyed.

Another object of the present invention is to provide an improved conveyor which may be utilized to advance molds to and from the jiggering station of the above outlined apparatus, to provide improved supports for the molds, and to provide improved jigger heads for the molds which insure that the molds are properly held in the course of a jiggering operation.

A further object of the invention is to provide an improved method of treating masses of clay or the like in an apparatus of the above outlined characteristics.

Briefly stated, one feature of my invention resides in the provision of an apparatus for shaping articles of pottery in or on revolving molds. The apparatus comprises a frame, a carriage mounted in the frame for substantially vertical reciprocatory movement between a raised position and a lower position, one or more rotary cams or analogous actuating means for intermittently moving the carriage between raised and lower positions, at least one row of vertical spindles rotatably mounted in the carriage, drive means provided on the carriage and arranged to rotate the spindles, a mold-supporting jigger head provided at the upper end of each spindle, a slide mounted in the frame for substantially horizontal reciprocatory movement toward and away from the jigger heads, one or more cams or similar actuating means for reciprocating the slide, and at least one row or rotary shaping tools mounted on the slide. Each shaping tool cooperates with a mold on the corresponding jigger head to shape a mass of clay when the carriage is moved to its raised position.

The apparatus also comprises an intermittently operated conveyor which is located at a level between the raised and lower positions of the jigger heads. The conveyor comprises rows of apertured mold-receiving supports and the supports of one row register with the jigger heads between intermittent advances of the conveyor so that the jigger heads may move upwardly in order to lift the molds from the respective supports or downwardly in order to deposit the molds in aligned supports.

The operation of drive means for the conveyor is synchronized with the operation of both actuating means so that the molds are fed to and withdrawn from the jiggering station while the shaping tools are disengaged from the blanks and while the carriage remains in its lower position.

The method of my invention comprises the steps of advancing the conveyor by a step so as to move a row of supports with clay-containing molds into registry with and to a level above the jigger heads, raising the carriage so that the jigger heads pass through the registering supports and lift the molds into the jiggering station and into the range of the shaping tools whereby each tool jiggers the mass in the respective mold to form a blank, moving the slide in a first direction to reduce the wall thickness of the blanks, moving the slide in the opposite direction to disengage the tools from the corresponding blanks, lowering the carriage so that the jigger heads pass through and deposit the molds with finished blanks in the registering supports, and advancing the conveyor to move a fresh row of supports with clay-containing molds into registry with the jigger heads and to simultaneously advance molds with finished blanks therein toward the drying station.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawings, in which:

FIG. 3 is an enlarged fragmentary vertical section substantially as seen in the direction of arrows from the line III—III of FIG. 2;

Figure 1:
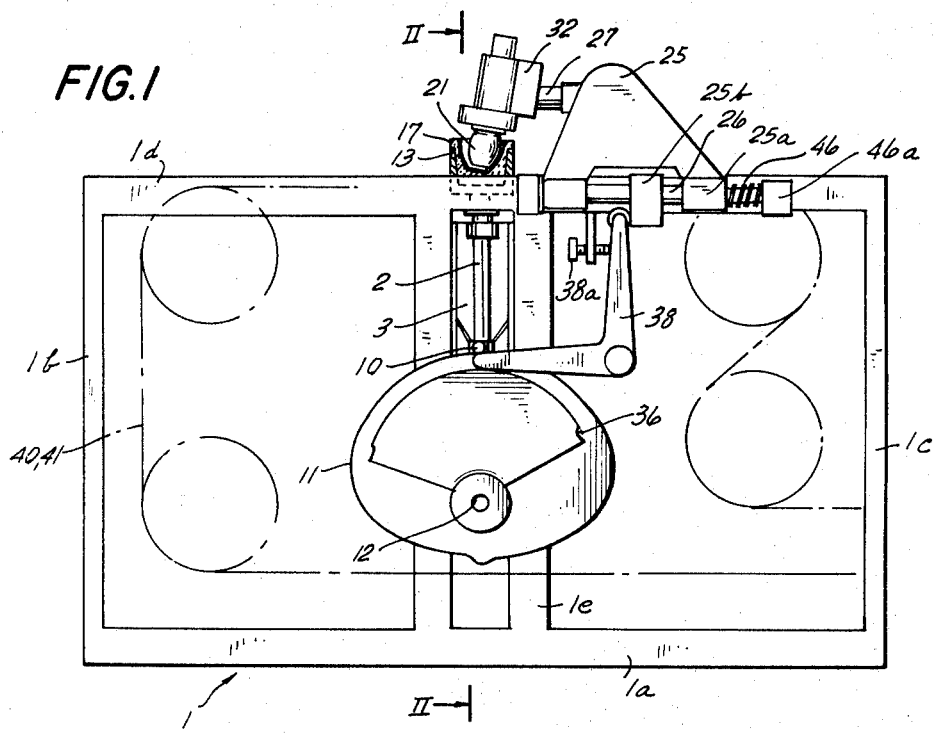
FIG. 1 is an end elevational view of a jiggering apparatus which embodies my invention, with certain parts shown in vertical section.
Figure 2:
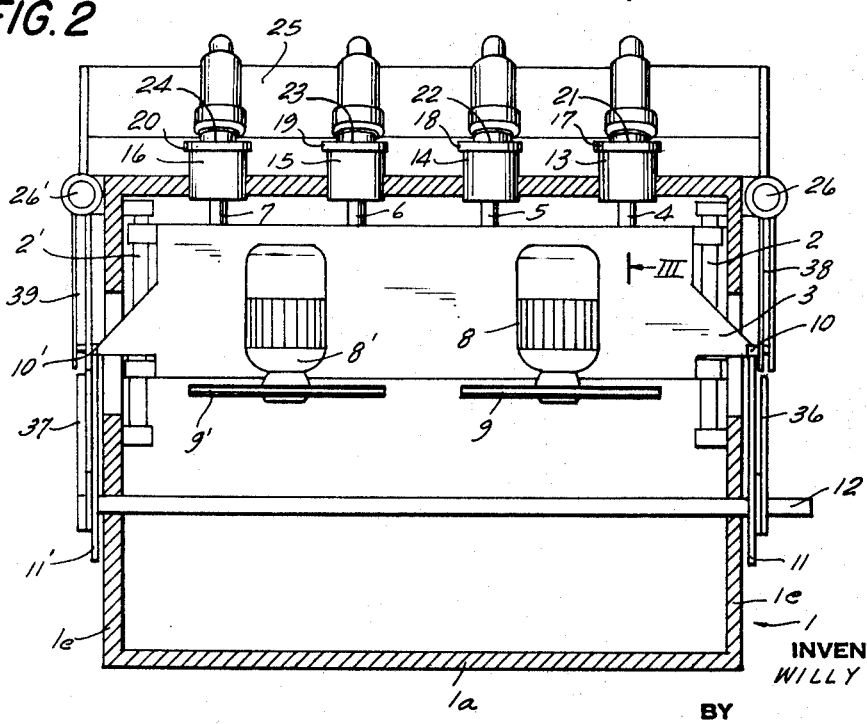
FIG. 2 is a vertical section susbtantially as seen in the direction of arrows from the line II—II of FIG. 1.

Referring to FIGS. 1 and 2, there is shown a jiggering apparatus for shaping cups and similar clay-ware which comprises a frame 1 having a base 1a, upstanding front and rear frame members 1b, 1c, a top frame member 1d, and upstanding intermediate frame members 1e. The inner sides of the frame members 1e are provided with supporting brackets for vertical guide rods 2, 2' which guide a vertically reciprocable carriage 3. This carriage supports a row of four equidistant vertical spindles 4, 5, 6 and 7 which are rotated by a drive mounted on the carriage 3 and including electric motors 8, 8' and belt and pulley assemblies 9, 9'. The manner in which the assemblies 9, 9' rotate the spindles is not specifically shown in the drawings. Both longitudinal ends of the carriage 3 are provided with roller followers 10, 10' which track the faces of two suitably configurated plate cams 11, 11' located externally of the frame 1 and mounted on a horizontal cam shaft 12 which is journalled in the intermediate frame members 1e. In FIGS. 1 and 2, the spindles 4 to 7 are shown in raised positions and the upper end portion of each of these spindles carries a jigger head 13, 14, 15, 16 for a suitably configurated mold 17, 18, 19, 20. The molds 17–20 contain masses 31a of clay (see FIG. 3) which are shaped by rotary shaping tools 21, 22, 23, 24. In their raised positions of FIGS. 1 and 2, the spindles 4–7 are lifted to such a level that the shaping tools 21–24 respectively extend into the cavities of the molds 17–20.

The shaping tools 21–24 are mounted on a common carriage 25, hereinafter called slide to differentiate from the carriage 3, and this slide 25 is reciprocable in a horizontal path defined by two horizontal guide rods 26, 26' mounted on the top frame member 1d. FIG. 3 shows that the shaping tool 21 is mounted on a plunger 27 which is reciprocable in a cylinder 28 carried by the slide 25. The plunger 27 is biased forwardly by a helical expansion spring 29 which is accommodated in the cylnder 28, and its forward movement is limited by an adjustable stop screw 30 which is slidable in the rear wall 28a of the cylinder 28 and extends into a centrally located tapped bore provided in the rear end face of the plunger 27. In the position of FIG. 3, forward movement of the plunger 27 is prevented by the head of the screw 30 which abuts against the outer side of the end wall 28a, but the plunger 27 is free to move rearwardly in response to a pressure which overcomes the bias of the spring 29. In other words, the shaping tool 21 is reciprocable in a horizontal plane, together with and relative to the slide 25. The mounting of the shaping tools 22–24 is analogous. The stop screw 30 will be rotated if the operator wishes to change the wall thickness of the cup which is obtained by shaping the ceramic mass 31a in the cavity of the respective mold 17, 18, 19 or 20.

In addition to being adjustable with reference to the slide 25 (in a direction in which the slide 25 reciprocates in a horizontal plane), the shaping tools 21–24 are also adjustable with reference to their respective plungers 27 in a manner as shown in FIG. 3. Thus, the forward end of the plunger 27 has a vertical tongue 27a which carries a horizontal pivot pin 34 extending at right angles to the guide rods 26, 26' and supporting the bifurcated rear end portion 32a of a holder 32. The holder 32 is rockable on the pivot pin 32 and carries a bearing sleeve 32b for the drive shaft 21a of the shaping tool 21. The sleeve 32b is movable axially of the holder 32 and may be adjusted by a bolt 33. An adjusting screw 35 meshes with the tongue 27a and its tip bears against the holder 32 so that rotation of the screw 35 will result in angular movement of the shaping tool 21 about the axis of the pivot pin 34. A lock screw 35a is tightened when the holder 32 is moved to a desired angular position with reference to the pivot pin 34. It will be seen that the shaping tool 21 may rotate about the axis of the shaft 21a, that the tool 21 may be adjusted in the axial direction of the shaft 21a, that this tool may be rocked about the axis of the pivot pin 34, that the tool holder 32 may share axial movements of the plunger 27 with reference to the cylinder 28, and that the plunger 27 also shares all reciprocatory movements of the slide 25. This enables the shaping tool 21 to assume an optimum position with reference to the associated mold 17 and to be moved away from the actual jiggering station. The mounting of the shaping tools 22–24 on their respective plungers is analogous. The manner in which the tools are driven by a motor through belts and pulleys or the like is known and froms no part of my invention.

In operation, the shaping tools 21–24 are positioned in such a way that the wall thickness of the resulting partly finished blanks 31 exceeds the wall thickness of ultimate cups. The first jiggering step is followed by a second step during which the wall thickness of each blank 31 is reduced to its final dimension. In the first stage of the jiggering operation, the slide 25 is biased forwardly by a pair of strong helical expansion springs 46 (one shown in FIG. 1) which operate between stationary stops 46a and the eyes 25a of the slide 25, the eyes 25a being slidably mounted on the guide rods 26, 26'. The forward stroke of the slide 25 is limited by a pair of motion transmitting levers 38, 39 which are located at the outer sides of the intermediate frame members 1e and whose upwardly extending arms carry rollers engaging suitable projections 25b on the slide 25. The forwardly extending arms of the levers 38, 39 carry follower rollers which respectively track the faces of two plate cams 36, 37 mounted on the cam shaft 12. The springs 46 tend to move the shapping tools 21–24 away from the internal surfaces of the respective blanks 31 and the upwardly extending arms of the levers 38, 39 oppose such movement to the extent determined by the configuration of the cams 36, 37. Once the first stage of the jiggering operation is completed, the cams 36, 37 cause the levers 38, 39 to rock in a clockwise direction, as viewed in FIG. 1, and move the shaping tools nearer to the internal surfaces of the respective blanks 31 so that the wall thickness of the blanks decreases until it reaches the optimum value. Such gradual reduction in the wall thickness of the blanks insures proper compacting of the ceramic mass 31a and enables the shaping tools to follow pronounced concave outlines of internal surfaces on the molds 17–20. Adjustable stops 38a limit the forward stroke of the slide 25 when the springs 46 are free to expand in response to completion of the last stage of a jiggering operation. Once the operation is completed, the spindles 4–7 descend to their lower positions in response to rotation of the cams 11, 11'. These cams are configurated in such a way that they allow the carriage 3 to descend whenever the cam shaft 12 assumes a predetermined angular position. As shown in FIG. 1, the cam 11 is of oval outline and may move the carriage 3 upwardly or it allows the carriage to descend by gravity. It is clear that the apparatus may comprise biasing means for urging the carriage 3 to its lower end position so that the followers 10, 10' will invariably engage the faces of the cams 11, 11'.

The apparatus of my invention further comprises an intermittently operated conveyor including a pair of endless chains 40, 40', shown in FIG. 3, and traverses 41, 42, 43 whose ends are pivotably secured to the links of chains 40, 40'. The traverses which travel with the upper horizontal stringers of the chains 40, 40' are located at a level above the jigger heads 13–16 when the carriage 3 descends to its lower position so that the traverses may advance above the jigger heads. Each travese carries four transversely aligned elestically deformable annular supports, shown at 51, 52, 53, which are provided with inwardly extending collars 51a, 52a, 53a adapted to engage external shoulders 17a on the molds 17–20 so that the molds are suspended in the respective supports (see the supports 53) when the carriage 3 descends. The central apertures of the annular supports 51–53 are large enough to allow for unobstructed passage of the jigger heads 13–16 when the respective traverse (e.g., the traverse 42 shown in FIG. 3) comes to a halt at the jiggering station.

When a jiggering operation is completed and the springs 46 are free to move the tools 21–24 away from the internal surfaces of the finished blanks 31, the cams 11, 11' allow the carriage 3 to descend whereby the jigger heads 13–16 travel through the central apertures of the supports 52 on the traverse 42 and deposit the molds 17–20 on the collars 52a. The jigger heads continue to descend until their top faces move to a level beneath the traverse 42 so that the chains 40, 40' may advance by a step in order to move the annular supports 51 on the traverse 41 in registry with the jigger heads 13–16. Each support 51 accommodates the conical lower portion of a mold 17' and each such mold contains a mass 31a of ceramic material which suffices to yield a cupped blank 31 or a similar article. Once the chains 40, 40' cease to advance in the direction indicated by the arrow 40a, the cams 11, 11' cause the carriage 3 to rise whereby the jigger heads 13–16 automatically lift the molds 17' and cause them to advance to the level of the mold 17 shown in the central portion of FIG. 3. The apparatus is now ready to carry out the next jiggering operation with ceramic masses 31a. Of course, during each jiggering operation, the operators insert a fresh row of four molds 17a into the supports of that traverse which follows the traverse 41, and so forth. It is also clear that the molds 17' may be filled and placed onto the conveyor by automatic or semiautomatic machinery whose construction forms no part of the present invention. Furthermore, the apparatus may comprise a row including only two- three or five or more jigger heads and an equal number of shaping tools, depending on the desired maximum output.

In order to make sure that the apparatus is automatically arrested when a mold is either damaged or destroyed, I prefer to provide an automatic control device which is shown in FIG. 3 and serves to test the integrity of molds. This control device comprises a switch 44 for each jigger head and trips 45 which preferably resemble rollers and normally extend into the path of molds which are in the process of leaving the jiggering station. The mold 17" shown in FIG. 3 actuates the trip 45 to close the switch 44 whereby the switch completes the circuit of the motor which lifts the carriage 3 to the upper end position shown in FIG. 3. If the switch 44 is open, the carriage 3 cannot be lifted and the operator notes that one of the molds 17" is damaged or destroyed. It is also clear that the switch 44 may normally remain open and is caused to complete the electric circuit of a suitable signal generating device only when the trip 45 fails to meet a mold 17" during an interval between stepwise advances of the chains 40, 40'. The molds normally consist of gypsum or other comparatively brittle material and might break if they are not properly accommodated in the jigger heads, if the shaping tools exert an excessive pressure, or if a rigid body (such as a stone or a piece of metal) happens to be admixed to the ceramic mass 31a. If the operators note that the apparatus is at a standstill or if one of the switches 44 initiates the generation of a visible or audible signal, the defective mold 17" is replaced by a satisfactory mold and the apparatus is ready for the next operation.

Figure 5:
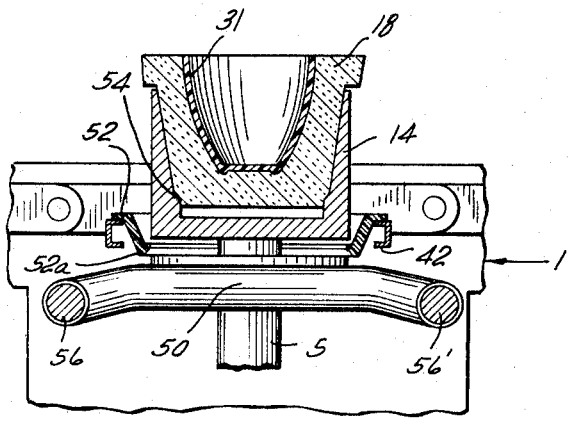
FIG. 5 is a section as seen in the direction of arrows from the line V—V of FIG. 4.
Figure 4:
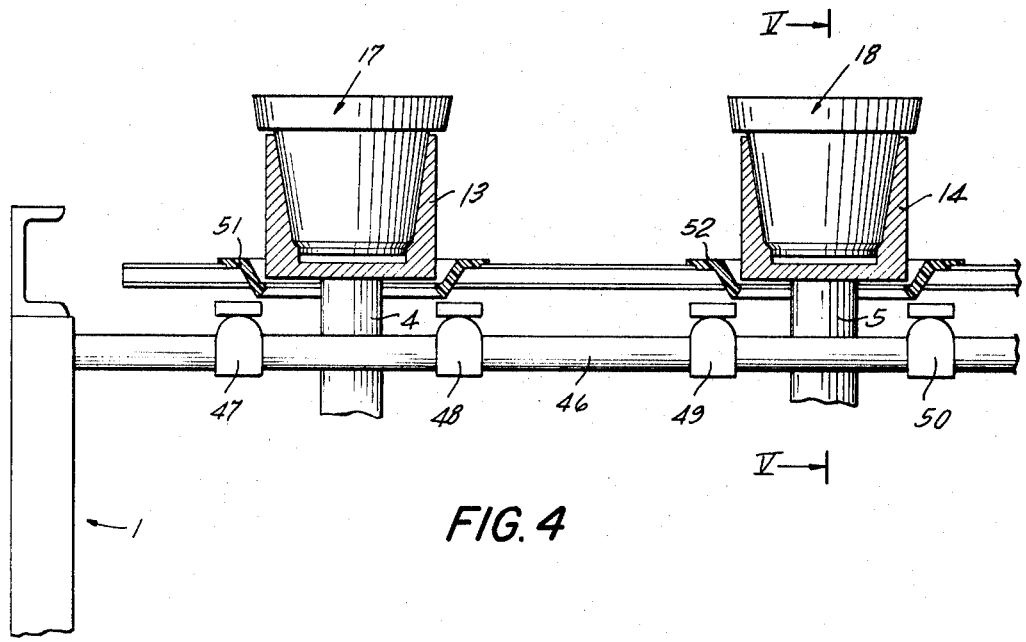
FIG. 4 is a fragmentary section as seen in the direction of arrows from the line IV—IV of FIG. 3.

At the jiggering station, the frame 1 of the improved apparatus supports a pair of horizontal rods 56, 56' (see FIGS. 4 and 5) which carry suitably configurated propping brackets 47, 48, 49, 50. These brackets serve to prop the annular supports 51, 52, 53 at the time the carriage 3 moves downwardly because the extraction of molds 17–20 from the jigger heads 13–16 normally requires some force which the annular supports might not be able to withstand. The elasticity of the annular supports 51, 52, 53 insures that the molds are not damaged during extraction from the jigger heads. FIGS. 3 to 5 further show that the flanges 17a at the upper ends of the molds 17–20 do not rest on the top faces of the respective jigger heads and that such flanges extend radially outwardly beyond the outlines of the jigger heads to make sure that they are automatically engaged by the collars 51a–53a of the annular supports when the carriage 3 descends. As best shown in FIG. 3, the lower part of each mold has an annular seat 54 which receives a complementary shoulder of the jigger head so that the mold is positively held in a position in which its flange 17a is slightly spaced from the top face of the jigger head. This means that the flange 17a is not pressed against the jigger head, a feature which reduces the likelihood of damage to or eventual breakage of the mold.

The conveyor advances the finished blanks into and through a drying apparatus (not shown) which is located past the jiggering station. The traverses 41, 42, 43 are tiltably secured to the chains 40, 40' so that the supports 51–53 remain in horizontal planes when the corresponding portions of the chains 40, 40' travel around sprockets (not shown).

The construction of the synchronizing unit which insures that the conveyor chains 40, 40', the carriage 3 and the slide 25 move at requisite intervals and in proper sequence forms no part of my invention and is not shown in the drawings. This synchronizing unit controls rotation of the cam shaft 12 and of sprockets for the chains 40, 40'.

A very important feature of my improved apparatus resides in that the carriage 3 reciprocates with the spindles 4 to 7. Thus, each spindle must only rotate with reference to the carriage 3 but shares all other movements of the carriage. In certain heretofore known apparatus, each spindle reciprocates individually and, therefore, the spindles must be mounted in complicated bearings. Furthermore, such conventional apparatus must comprise costly actuating devices which reciprocate the spindles with reference to the shaping tools. The spindles are mounted beneath the jiggering station and their bearings must be properly sealed against entry of foreign matter, particularly against particles of clay which are removed from ceramic masses 31a and blanks 31. Satisfactory sealing of the bearings for spindles which reciprocate with reference to their supports is much more difficult and more expensive than the sealing of bearings for the spindles 4–7 which merely rotate but need not move axially with reference to the carriage 3.

The apparatus of my invention is sufficiently compact to allow for mounting of spindles 4–7 at a level which can be reached by a person of average build. In certain heretofore known apparatus, the drive for the spindles occupies so much room that the operators must stand on pedestals or platforms in order to gain access to the jiggering station. In my improved apparatus, the drive (8, 8', 9, 9') for rotating the spindles 4–7 is mounted on the carriage 3 which considerably reduces the bulkiness, the initial cost and the maintenance cost of the apparatus. The cams 11, 11' and 36, 37 are located outside of the frame 1 so that each thereof may be rapidly adjusted or exchanged.

It is also clear that the apparatus of my invention may comprise two or more rows of jigger heads and an equal number of shaping tools so that the number of blanks to be treated in a single jiggering operation may be a whole multiple of the number of jigger heads in a single row. For example, the apparatus of FIGS. 1 to 5 could be modified to comprise two rows of jigger heads each containing four jigger heads, and an equal number of rows of shaping tools. In such modified apparatus, the conveyor including the chains 40, 40' would advance by two steps whenever the jigger heads descend so that two rows of apertured elastic supports would register with the jigger heads during each interval between intermittent advances of the conveyor.

Without further analysis, the foregoing will so fully reveal the gist of the present invention that others can, by applying current knowledge, readily adapt it for various applications without omitting features which faily constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. An apparatus for shaping articles of pottery comprising, in combination, a frame; an elongated carriage mounted in said frame for substantially vertical reciprocating movement between a raised position and a lowered position; first moving means cooperating with said carriage for intermittently moving the latter between said positions thereof; a row of substantially vertical spindles rotatably carried by said carriage spaced in direction of the elongation of the latter from each other; a mold supporting jigger head mounted at the upper end of each spindle; a slide mounted on said frame above said carriage and movable in a substantially horizontal plane in direction transverse to the elongation of said carriage; a row of rotary shaping tools carried by said slide spaced from each other in the same manner as said spindles so as to cooperate respectively with molds located in said mold supporting jigger heads to jigger a ceramic mass in each of the respective molds when said carriage is moved to said raised position; intermittently operated conveyor means located at a level between said raised and said lowered positions of said jigger heads and movable in said transverse direction, said conveyor means including a plurality of elongated members spaced from each other in said transverse direction and each carrying a row of apertured mold-receiving supports spaced from each other in direction of elongation of said member in the same manner as said spindles, said conveyor means intermittently transporting said elongated members to a position in which the jigger heads on said row of spindles are respectively aligned with the row of mold-receiving supports on one of said elongated members so that molds carried by the row of mold-receiving supports on said one member will be lifted by the respective jigger heads during movement of said carriage from said lowered to said raised position into a position in which said tools will cooperate with said molds in said jigger heads to jigger the ceramic mass in each of said molds; and second moving means cooperating with said slide to move the latter and the tools carried thereby a small distance in said transverse direction while said spindles are in said raised position and said transporting means is at standstill.

2. An apparatus as defined in claim 1, and including drive means carried by said carriage for driving said spindles.

3. An apparatus as defined in claim 1, wherein each of said moving means includes cam means and cam follower means respectively cooperating with said carriage and said slide.

4. An apparatus as defined in claim 3, wherein said cam means of said first and second moving means are mounted on a common shaft for rotation therewith so that said carriage and said slide will move in timed relationship with respect to each other.

5. An apparatus as defined in claim 1, and including control means located in the path of said molds in said supports for detecting defective molds in supports which are advanced beyond said position of alignment with said jigger heads.

6. An apparatus as defined in claim 1, and including fixed propping means in said frame for propping said row of supports which are in alignment with said jigger heads.

7. An apparatus as defined in claim 6, wherein said supports consist of elastically deformable material.

8. An apparatus as defined in claim 1, wherein each jigger head has a cavity arranged to accommodate only the lower portion of the mold.

9. An apparatus as defined in claim 1, and including adjusting means for adjusting the position of said shaping tools with respect to said slide.

10. An apparatus as defined in claim 9, wherein said adjusting means comprises means for adjusting the shaping tools in the axial direction thereof.

11. An apparatus as defined in claim 9, wherein said adjusting means comprises means for adjusting the angular position of said shaping tools about horizontal pivot axes which are normal to the direction of reciprocation of said slide.

12. An apparatus as defined in claim 9, wherein said adjusting means comprises means for adjusting the position of said shaping tools in directions substantially parallel with the direction of reciprocation of said slide.

References Cited

UNITED STATES PATENTS

| | | | |
|---|---|---|---|
| 2,455,744 | 12/1948 | Emerson | 25—24 |
| 2,729,870 | 1/1956 | Guthrie | 25—24 |
| 2,930,095 | 3/1960 | Knapp | 25—24 |

J. SPENCER OVERHOLSER, *Primary Examiner.*

R. D. BALDWIN, *Assistant Examiner.*